May 23, 1967
M. ETTER
3,321,697
SINGLE COMMUTATION MEANS FOR SINGLE PHASE OR
MULTI-PHASE INVERTERS
Filed Aug. 9, 1963
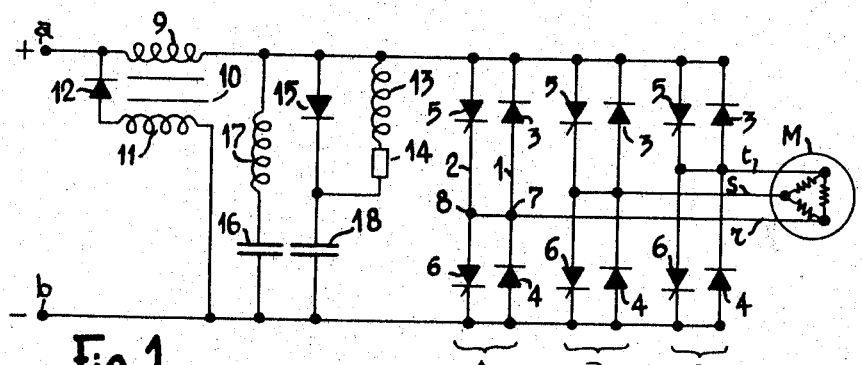
Fig.1
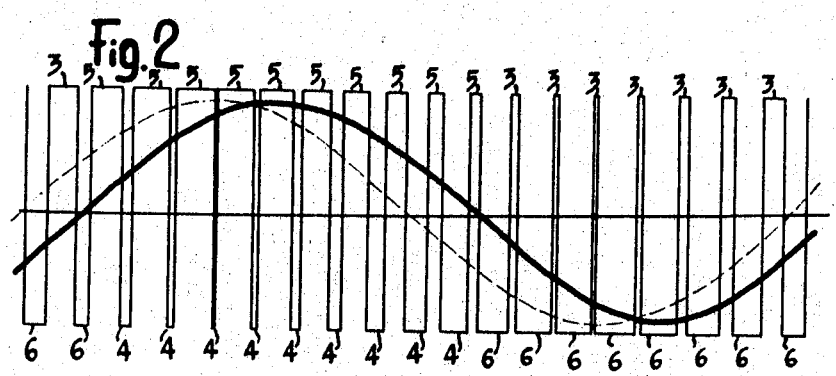
Fig.2
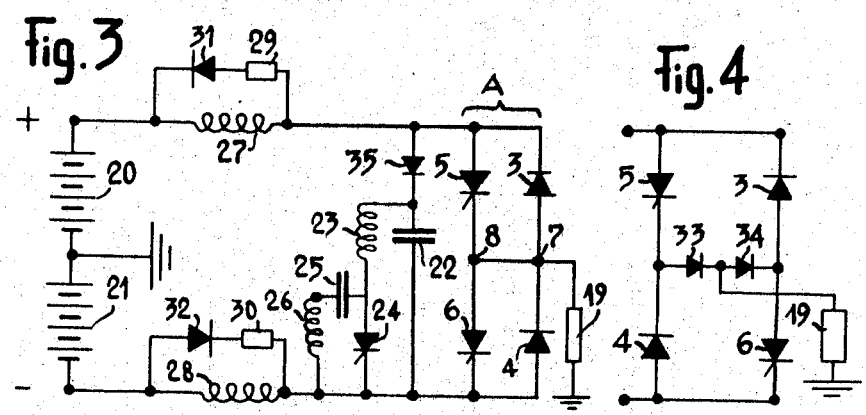
Fig.3
Fig.4
Inventor:
MARCEL ETTER
By: McGlew and Toren
Attorneys

United States Patent Office 3,321,697
Patented May 23, 1967

3,321,697
SINGLE COMMUTATION MEANS FOR SINGLE PHASE OR MULTI-PHASE INVERTERS
Marcel Etter, Blvd. des Promenades 6, Carouge-Geneva, Switzerland
Filed Aug. 9, 1963, Ser. No. 301,063
Claims priority, application Switzerland, Aug. 13, 1962, 9,577/62
7 Claims. (Cl. 321—45)

Generators of currents having variable amplitudes and polarities are already known, chiefly in the case of alternating currents, said generators including preliminary a line breaker unit fed by a supply of D.C., which unit includes at least two solid thyratrons connected each with one of the terminals of the D.C. supply, while the polarity of said thyratrons is such as well allow the passage of the D.C. from the supply, said unit including furthermore two diodes connected each with one terminal of said supply and the polarity of which is opposed to that of the solid thyratrons, the output of said generator being furthermore connected with an intermediate point between said diodes and solid thyratrons, means being adapted to provide, as desired, conductivity or non-conductivity for each of the solid thyratrons with a view to obtaining the desired output signals.

In the known generators of this type and chiefly in generators of undulating current, the extinction of one thyratron can be obtained only through the ignition of another thyratron. For certain applications, it may be of advantage to block all the thyratrons simultaneously in a speedy and reliable manner, whereas in order to extinguish simultaneously all the thyratrons in any known arrangement, it is necessary to provide extinguishing means for each thyratron, which would make the generator much too bulky and expensive, chiefly in the case of the production of a polyphase current.

My invention has for its object to allow a speedy and simultaneous extinction of all the thyratrons of a generator with very simple means in a very cheap manner. My improved generator includes an arrangement for applying to the points of the unit which are connected with the terminals of the supply of direct current, a voltage producing the passage of a reverse current through the unit, so as to make the ignited thyratron or thyratrons of the unit non-conductive.

I have illustrated diagrammatically and by way of example in the accompanying drawings several embodiments of said improved generator. In said drawings:

FIG. 1 is a diagrammatic illustration of a first embodiment adapted to produce a three-phase current, FIG. 2 is a graph illustrating the production of a sinusoidal voltage, FIG. 3 is a diagrammatic illustration of a second embodiment adapted to produce a one-phase current, FIG. 4 illustrates a fraction of a modified generator.

The generator illustrated in FIG. 1 is of particular interest for the feeding of an asynchronous motor M since it allows modifying readily and with a great adaptability the speed, direction of rotation and the power of said motor. In fact, by reason of the ease of blocking simultaneously all the solid thyratrons, it is easy to produce an A.C. voltage of any desired frequency and amplitude by forming said voltage through a succession of pulses of varying durations and polarities, the frequency of said pulses being much higher than that of the A.C. voltage to be obtained.

The supply of electric power is constituted by a D.C. supply which is not illustrated and which is connected with the two input terminals $a$ and $b$ of the generator. The latter includes three parallel line breakers A, B and C constituted each by two sections 1 and 2 inserted in parallel. The section 1 includes two uni-directional conductive elements formed by the diodes 3 and 4 connected in series while the section 2 includes two uni-directional conductive elements 5 and 6, the conductivity of which is controlled and which are inserted in series and have their polarities opposed to that of the diodes 3 and 4 of the other section 1. The medial points 7 and 8 connecting the two elements 1 and 2 of each unit are interconnected and form an output tapping for one of the A.C. phases. The three units A, B, C are thus provided each with a corresponding output terminal $r$, $s$, $t$ for the three-phase current.

The elements 5 and 6, the conductivity of which is controlled, are constituted each by a solid thyratron or so-called controlled diode. These semi-conductive elements, the operation of which is comparable with that of gas-filled thyratrons, may be brought to a conductive condition by applying a pulse of a short duration to a control electrode and they remain conductive as long as the current passing through them is not reversed or has not dropped to zero. In order to cut off suddenly their conductive condition, it is therefore necessary to produce a reversal of the current passing through them during a comparatively short time, of a magnitude of say 20 microseconds.

The generator according to FIG. 1 includes furthermore, in series between the input terminal $a$ and the units A, B, C, the primary 9 of a transformer 10 of which the secondary 11 is inserted, in series with a diode 12, across the two input terminals $a$ and $b$ of the supply.

An oscillating circuit is inserted in parallel with the units A, B, C, said circuit including a condenser 16 and an induction coil 17 in series. The generator includes furthermore an induction coil 13 in series with a resistance 14, said induction coil and resistance being shunted by a diode 15. The resistance 14 may, if required, be constituted solely by the ohmic resistance of the coil 13. The diode 15 and the induction coil 13 associated with the resistance 14 are, furthermore, connected in series with a condenser 18.

To produce a three-phase A.C. adapted to feed the motor M, the solid thyratrons 5 and 6 of the three units are controlled by an electronic system which is not illustrated. Considering only the unit A, it is apparent that the medial point 7-8 of the latter is brought to the positive voltage of the input terminal $a$ when the solid thyratron 5 is conductive, whereas it is brought to the negative voltage of the input terminal $b$ when the solid thyratron 6 is conductive. The average voltage of said medial point 8 may thus be brought to any desired intermediate value by making the thyratrons alternatingly conductive and non-conductive to produce positive phase pulses through the thyratron 5 and negative phase pulses through the thyratron 6 while the ratio between the durations of the conductive and non-conductive periods is adjusted to obtain said value for the average voltage.

FIG. 2 is a graph of the successive conductive periods of the solid thyratrons 5 and 6 and of the diodes 3 and 4, associated to produce an average voltage of a sinusoidal shape.

In said FIG. 2, the solid line illustrates the average current of a phase, while the dotted line illustrates the average voltage of the medial point of the unit considered. It will be remarked that there exists a certain phase shifting between current and voltage by reason of the inductive load formed by the motor M. The instantaneous voltage is illustrated by a curve constituted by a series of rectangles and extending from a positive to a negative value according as to whether the medial point of the unit is connected with an input terminal $a$ or $b$ through a thyratron 5 or 6 or through a diode 3 or 4. In registry with each point at which the curve of instantaneous voltage reaches an extremum, there is drawn in registry with the latter, the reference number of the thyratron or diode, according to the case, through which the current is then allowed to pass. At the beginning of the curve, the current is negative and passes through the thyratron 6 each time the latter is ignited and it passes then through the diode 3 when said thyratron is extinguished. When the current is controlled so as to become positive, it passes through the thyratron 5 each time the latter is ignited and then through the diode 4 when it is extinguished. The passage of current through the diodes, 3 or 4, according to the case, is ascribable to the impedance formed by the motor M. The solid thyratrons of the three units A, B and C are controlled in a manner such that the average voltages at the medial points 7–8 of said units may vary in conformity with the conditions governing a three-phase network. The phase-shifted current passing through the motor M is then of a substantially sinusoidal shape and it includes only a reduced undulation at the frequency of the conductivity pulses fed to the solid thyratrons 5 or 6, since said current is filtered by the actual induction of the windings of the motor M; by reason of said induction, the current cannot be cut off suddenly when a thyratron passes from its conductive condition to a nonconductive condition, whereby the current continues flowing through another path as provided by the presence of the diodes 3 and 4. Thus, at the moment of the extinction of the thyratron of one unit, the current passing through said thyratron is replaced by a current passing through the diode 4 which cuts out furthermore the production of any undesirable overvoltage at the medial point of the unit considered. Similarly, at the moment of the extinction of the thyratron 6 of a unit, the current passing through said thyratron is replaced by the current passing through the diode 3 of the same unit.

It is obvious that it is possible to adjust the durations of the periods of conductivity and non-conductivity of the solid thyratrons so as to obtain for the potential of the phases at $r$, $s$, $t$, any desired value and, consequently, this allows adjusting, as required, the frequency and the amplitude of the three-phase voltage.

If required, it is also possible to modify the shape of the voltage curve and to make the generator produce a non-sinusoidal voltage, say a voltage of a rectangular shape or of a sawtooth shape.

The diagram illustrated in FIG. 1 shows the means provided for the simultaneous extinction of the thyratrons 5 and 6 of the three units A, B, C, through a transient reversal of the current passing through them. Said means are constituted by the oscillating circuit formed by the condenser 16 and the induction coil 17.

When it is desired to extinguish the ignited solid state thyratrons, a control pulse is sent into all the thyratrons, so as to make them all conductive, which leads to an oscillatory discharge of the condenser 16.

During the first fraction of the discharge, the current produced and passing through the induction coil 17 reverses the potential of the condenser 16. The latter again discharges and the discharged current passes first through all the thyratrons 5 and 6 in a direction opposed to their direction of normal conductivity, which leads to their extinction, after which the current flows back through the diodes 3 and 4.

No dangerous increase in the current supplied by the source of energy at the moment of the short circuit produced by the simultaneous ignition of all the thyratrons is possible, by reason of the presence of the primary winding 9 inserted in series in the circuit. Said primary plays the part of an induction coil, since the direction of the transformer windings 9 and 11 is selected in a manner such that for an increase in the current flowing through the winding 9, the polarity of the voltage induced in said winding 9 is such that a secondary current cannot appear as a consequence of the blocking produced by the diode 12. Furthermore, the core of the transformer 10 is provided with a large gap so as to prevent its saturation.

After blocking the thyratrons, the current in the motor M, which does not become instantaneously equal to zero, as already mentioned hereinabove, passes through the diode 3 or 4 according to the case, so as to load the condensers 16 and 18 after which it enters the supply through the terminals $a$ and $b$ in a direction opposed to the normal direction of feed of current. This results in a reduction and in a subsequent reversal of the current in the primary 9 of the transformer 10 which leads to the production of a high overvoltage across the terminals of said primary winding. Said overvoltage is held within allowable limits by reason of the presence of the secondary winding 11 connected across the terminals of the supply in series with the diode 12. Thus, at the moment of the reversal of the current in the primary 9, the voltage induced in the seconary produces a current adapted to reload the supply. The allowable overvoltage in the primary is defined by the transformer ratio which may advantageously be of the magnitude of 1:4 so as to limit the overvoltage within an increase of 25%.

The simultaneously ignition of all the thyratrons 5 and 6 also produces the discharge through the induction coil 13 of the condenser 18. The latter is charged through the diode 15, which latter is also adapted to prevent any oscillation from arising during the discharge of the condenser 18. The oscillating circuit 13, 18 has an oscillatory period the magnitude of which is about twice that of the oscillating circuits 16, 17 so that the condenser 18 may be practically discharged at the moment of the reversal of current in the thyratrons 5 and 6. When the extinguishing current ceases flowing through the diodes 3 and 4, the presence of the condenser 18 limits the rising edge of the voltage across the terminals of the units A, B, C. This cuts out the possibility of a too sudden return of voltage across the thyratrons 5 and 6 and the untimely reignition of the latter which may be performed thereby.

With the circuit illustrated, it is no longer necessary to send a control pulse into all the thyratrons, so as to provide for their extinction. As a matter of fact, it is sufficient to make the second thyratron conductive in a unit in which the first thyratron is already in a conductive condition, so as to allow automatically the extinction of all the units. This feature ensures perfect safety in the case of the fortuitous ignition of both thyratrons of one section.

FIG. 3 illustrates a further embodiment adapted to produce a one-phase A.C. In said embodiment, the feed is ensured by a supply of D.C. which is symmetrical with reference to ground, said supply being constituted by two batteries 20 and 21 inserted in series and of which the common connecting point is grounded.

Said supply of D.C. feeds a line-breaker unit A constituted, in the same manner as the units of the first embodiment by two solid thyratrons 5 and 6 and two diodes 3 and 4. The junction point 7 common to the diodes and the thyratrons, is connected with a load illustrated diagrammatically by a resistance 19, but it may be constituted as well by any other load such as the armature of a D.C. motor, the direction of rotation of which may thus be very speedily reversed.

The extinguishing means are constituted by a condenser 22 in series with a diode 35 and by an induction coil 23 adapted to be connected in parallel with said condenser upon ignition of the auxiliary thyratron 24. The latter is bridged by an oscillating circuit including in series a condenser 25 and an induction coil 26.

In order to prevent any too speedy and high increase in current at the moment of the extinction of the unit A at which moment the voltage across the terminals of said unit A is practically zero, the terminals of the supply are connected with said unit through the agency of corresponding induction coils 27 and 28 each of which is shunted by a corresponding resistance 29 or 30 in series with a diode 31 or 32. Said resistances allow dissipating more speedily the inductive energy of the windings 27 and 28 after each extinction. In the case where the load feeds transiently some current back to the D.C. supply, the said current can pass through the diodes 31 and 32.

As in the case of the first embodiment, the output voltage of the generator, that is the voltage at the medial point 7 in the unit A, may be adjusted at any moment to the desired value by controlling the conductivity of the solid thyratrons 5 or 6 by means of pulses of a short duration. The electronic arrangement required for controlling the thyratrons 5 and 6 has not been illustrated for this embodiment and may be executed in any suitable manner.

When one of the solid thyratrons 5 or 6 has been ignited by the igniting means which are not illustrated, its extinction is produced by the oscillating discharge of the condenser 22. To this end, the auxiliary thyratron 24, forming part of a sort of contact-making system, is rendered conductive and consequently the condenser 22, which has been precedingly located by the supply through the diode 35, discharges into the induction coil 23 and has a tendency to reverse its voltage in the conventional manner. The inductive energy stored in the coil 23 feeds then through the unit A, and consequently through the operative thyratron, a current, the direction of which is opposed to that of the current feeding the load 19. As soon as the value of this reversed current rises above that of the normal current flowing through the load 19, the current in the thyratron considered is reversed and the latter is blocked.

The diode 35 is not essential but it is of advantage, since it allows cutting out the discharge of the condenser 22 in the case where the ignition of one of the thyratrons 5 or 6 produces a transient cutting off of the voltage across the terminals of the unit A.

If the load is of an inductive type, the current passing through it cannot become instantaneously equal to zero and it passes then through one of the diodes 3 or 4, according to its direction.

The extinction of the auxiliary thyraton 24 is executed in accordance with the same principle as that governing the extinction of the thyratrons 5 and 6 in the first embodiment. At the moment at which the thyratron 24 is rendered conductive by means of a short pulse, said condenser 25, which was brought to the same potential as the condenser 22, as a consequence of its galvanic connection with the supply of energy, discharges into the induction coil 26. The reversal of current produced during said oscillating discharge produces a flow of current in a reverse direction through the auxiliary thyratron 24, which is sufficient for producing its extinction, that is its setting into a non-conductive condition.

After the passage of the extinguishing current through the thyratron 5 or 6 of a line breaker, it is apparent that the current may flow shuntwise through the diodes 3 and 4. In order to obtain the reverse difference in voltage which is required for ensuring a speedy extinction of the thyratron, it is therefore necessary for this difference in potential to appear across the terminals of the corresponding diode. Said condition is not always easy to obtain, depending on the type of diodes and thyratrons used, and FIG. 4 illustrates a wiring diagram which allows ensuring more readily the extinction of the thyratrons.

According to this last modification, the thyratron 5 is connected in series with the diode 4, while the thyratron 6 is connected in series with the diode 3. The connection forming the middle of the unit is constituted by two diodes 33 and 34 inserted in series between the points common to the diode and thyratron in each series forming the unit and the output point of the unit is formed by a tapping between these two diodes 33 and 34. It is apparent that at the moment of the passage of the reverse extinguishing current, each solid thyratron is shunted by three diodes in series, and consequently it is possible to obtain, across the terminals of each thyratron, a reverse voltage which is three times larger than the voltage across the terminals of a single diode.

Obviously a similar result may be obtained by replacing the diodes 33 and 34 by other impedances, for instance by induction coils or even by mere resistances. It is also possible to use a single impedance if a slight dissymetry in the circuit is allowable.

It is obvious that the described arrangement is also useful for extinguishing the thyratrons in a generator producing a rectangular shaped wave, even when the amplitude and the frequency of said wave are not adjustable.

What I claim is:

1. A generator of current of an adjustable polarity comprising a pair of input terminals connected to a source of D.C. potential, a single pair of input conductors each connected to a respective input terminal, said conductors consisting of a positive input conductor and a negative input conductor, at least one line breaker unit connected across said input conductors and having two branches, each branch including a solid state thyratron connected in series with a diode to a common junction point, the solid state thyratron of each branch being connected in normal polarity and the associated diode in reverse polarity, with respect to the polarity of said input conductors, one thyratron of each unit being connected, on the one hand, to the positive input conductor and, on the other hand, through its associated diode to the negative input conductor, the other thyratron of each unit being connected, on the one hand, to said negative input conductor and, on the other hand, through its associated diode to said positive input conductor, the common junction points of the branches of each unit being interconnected to each other and with a respective output terminal of the generator, and oscillating circuit means inserted in parallel with said unit across said input conductors and selectively operable, when triggered conductive, to apply an oscillating potential between said conductors and across said thyratrons and said diodes to transiently reverse the current flow through said thyratrons relative to that supplied by the D.C. source thereby to extinguish any ignited thyratron.

2. A generator of current of an adjustable polarity comprising a pair of input terminals connected to a source of D.C. potential, a single pair of input conductors each connected to a respective input terminal, said conductors consisting of a positive input conductor and a negative input conductor, a plurality of line breaker units connected across said input conductors and each having two branches, each branch including a solid state thyratron connected in series with a diode to a common junction point, the solid state thyratron of each branch being connected in normal polarity, and the associated diode in reverse polarity, with respect to the polarity of said input conductors, one thyratron of each unit being connected, on the one hand, to the positive input conductor and, on the other hand, through its associated diode to the negative input conductor, the other thyratron of each unit being connected, on the one hand, to the negative input conductor and, on the other hand, through its associated diode to the positive input conductor, the common junction points of the branches of each unit being interconnected with each other and with a respective output terminal of the generator, and common oscillating circuit means inserted in parallel with said units across said input conductors and selectively operable, when triggered conductive, to apply an oscillating potential between said conductors and across said thyratrons and said diodes to transiently reverse the current flow through said thyratrons relative to that supplied by the D.C. source thereby to extinguish any ignited thyratron.

3. A generator of current of an adjustable polarity comprising a pair of input terminals connected to a source of D.C. potential, a single pair of input conductors each connected to a respective input terminal, said conductors consisting of a positive input conductor and a negative input conductor, at least one line breaker unit connected across said input conductors and having two branches, each branch including a solid state thyratron connected in series with a diode to a common junction point, the solid state thyratron of each branch being connected in normal polarity, and the associated diode in reverse polarity, with respect to the polarity of said input conductors, one thyratron of each unit being connected on the one hand, to the positive input conductor and, on the other hand, through its associated diode to the negative input conductor, the other thyratron of each unit being connected, on the one hand, to the negative input conductor and, on the other hand, through its associated diode to the positive input conductor, the common junction points of the branches of each unit being interconnected with each other and with a respective output terminal of the generator, an oscillating circuit inserted shuntwise across said input conductors with reference to at least one unit and including a condenser, and means selectively operable to effect an A.C. discharge of the condenser to apply an oscillating potential between said conductors and across said thyratrons and said diodes to transiently reverse the current flow through said thyratrons relative to that supplied by the D.C. source thereby to extinguish any ignited thyratron.

4. A generator of current of an adjustable polarity comprising a pair of input terminals connected to a source of D.C. potential a single pair of input conductors each connected to a respective input terminal, said conductors consisting of a positive input conductor and a negative input conductor, at least one line breaker unit connected across said input conductors and having two branches, each branch including a solid state thyratron connected in a series with a diode to a common junction point, the solid state thyratron of each branch being connected in normal polarity, and the associated diode in reverse polarity, with respect to the polarity of said input conductors, one thyratron of each unit being connected on the one hand, to the positive input conductor and, on the other hand, through its associated diode to the negative input conductor, the other thyratron of each unit being connected, on the one hand, to the negative input conductor and, on the other hand, through its associated diode to the positive input conductor, the common junction points of the branches of each unit being interconnected with each other and with a respective output terminal of the generator, an oscillating circuit inserted shuntwise across said input conductors with reference to at least one unit and including a condenser and an induction coil in series with the condenser, and means selectively operable to provide ignition of the non-ignited thyratrons, said ignition producing an A.C. discharge of the condenser to apply an oscillating potential between said conductors and across said thyratrons and said diodes to transiently reverse the current flow through said thyratrons relative to that supplied by the D.C. source thereby to extinguish any ignited thyratron.

5. A generator of current of an adjustable polarity comprising a pair of input terminals connected to a source of D.C. potential a single pair of input conductors each connected to a respective input terminal, said conductors consisting of a positive input conductor and a negative input conductor, at least one line breaker unit connected across said input conductors and having two branches, each branch including a solid state thyratron connected in series with a diode to a common junction point, the solid state thyratron of each branch being connected in normal polarity, and the associated diode in reverse polarity, with respect to the polarity of said input conductor, one thyratron of each unit being connected, on the one hand, to the positive input conductor and, on the other hand, through its associated diode to the negative input conductor, the other thyratron of each unit being connected, on the one hand, to the negative input conductor and, on the other hand, through its associated diode to the positive input conductor, the common juncture points of the branches of each unit being interconnected with each other and with a respective output terminal of the generator, an oscillating circuit inserted shuntwise across said input conductors with reference to at least one unit and including a condenser, and a shunt circuit for said condenser including an induction coil and a contact-maker in series, the closing of the contact-maker producing an A.C. discharge of the condenser to apply an oscillating potential between said conductors and across said thyratrons and said diodes to transiently reverse the current flow through said thyratrons relative to that supplied by the D.C. source thereby to extinguish any ignited thyratron.

6. A generator of current of an adjustable polarity comprising a pair of input terminals connected to a source of D.C. potential, a single pair of input conductors each connected to a respective input terminal, said conductors consisting of a positive input conductor and a negative input conductor, at least one line breaker unit connected across said input conductors having two branches, each branch including a solid state thyratron connected in series with a diode to a common junction point, the solid state thyratron of each branch being connected in normal polarity, and the associated diode in reverse polarity, with respect to the polarity of said input conductors, one thyratron of each unit being connected on the one hand, to the positive input conductor and, on the other hand, through its associated diode to the negative input conductor, the other thyratron of each unit being connected, on the one hand, to the negative input conductor and, on the other hand, through its associated diode to the positive input conductor, the common junction points of the branches of each unit being connected directly to each other to form a respective output terminal for the generator, and oscillating circiut means inserted across said input conductors in parallel with said unit and selectively operable, when triggered conductive, to apply an oscillating potential between said conductors and across said thyratrons and said diodes to transiently reverse the current flow through said thyratrons relative to that supplied by the D.C. source thereby to extinguish any ignited thyratron.

7. A generator of current of an adjustable polarity comprising a pair of input terminals connected to a source of D.C. potential, a single pair of input conductors each connected to a respective input terminal, said conductors consisting of a positive input conductor and a negative input conductor, at least one line breaker connected across said input conductors and having two branches, each branch including a solid state thyratron connected in series with a diode to a common junction point, the solid state thyratron of each unit being conected in normal polarity, and the associated diode in reverse polarity, with respect to the polarity of said input conductors one thyratron of each unit being connected, on the one hand, to the positive input conductor and, on the other hand, through its associated diode to the negative input conductor, the other thyratron of each unit being connected, on the one hand, to the negative input conductor, and, on the other hand, through its associated diode to the positive input conductor, at least one impedence connected between the two common junction points of each unit, a point of said impedance forming an output terminal for the generator, and oscillating circuit means inserted across said input conductors in parallel with said units and selectively operable, when triggered conductive, to apply an oscillating potential between asid conductors and across said thyratrons and said diodes to transiently reverse the current flow through said thyratrons relative to that supplied by the D.C. source thereby to extinguish any ignited thyratron.

References Cited by the Examiner
UNITED STATES PATENTS

| | | | |
|---|---|---|---|
| 2,820,189 | 1/1958 | Uhlmann | 321—16 X |
| 2,977,518 | 4/1961 | Kafka et al. | 318—138 |
| 3,127,550 | 3/1964 | Gilbreath et al. | |
| 3,207,974 | 9/1965 | McMurray | 321—45 |
| 3,213,287 | 10/1965 | King | 321—45 X |
| 3,219,905 | 11/1965 | Davis et al. | 321—44 X |
| 3,262,036 | 7/1966 | Clarke et al. | 318—231 X |

JOHN F. COUCH, *Primary Examiner.*

W. M. SHOOP, *Assistant Examiner.*